(12) United States Patent
Chen et al.

(10) Patent No.: US 12,294,970 B2
(45) Date of Patent: May 6, 2025

(54) SYSTEM AND METHOD FOR DIAGNOSING SENSOR PERFORMANCE OF AN ULTRA WIDE BAND SENSOR LOCALIZATION

(71) Applicant: GM Global Technology Operations LLC, Detroit, MI (US)

(72) Inventors: Jinzhu Chen, Troy, MI (US); Zijun Han, Rochester Hills, MI (US); Fan Bai, Ann Arbor, MI (US); Aaron Adler, Rochester Hills, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 434 days.

(21) Appl. No.: 18/049,902

(22) Filed: Oct. 26, 2022

(65) Prior Publication Data
US 2024/0172164 A1    May 23, 2024

(51) Int. Cl.
*H04W 64/00*    (2009.01)
*H04B 1/69*    (2011.01)

(52) U.S. Cl.
CPC .............. *H04W 64/00* (2013.01); *H04B 1/69* (2013.01)

(58) Field of Classification Search
CPC .................................. H04W 64/00; H04B 1/69
USPC ..................................................... 455/456.1
See application file for complete search history.

(56) References Cited

U.S. PATENT DOCUMENTS

| 2018/0067191 A1* | 3/2018 | Hamilton | ................. | G01S 5/14 |
| 2022/0099790 A1* | 3/2022 | Lim | ......................... | G01S 5/10 |

* cited by examiner

*Primary Examiner* — Ted M Wang
(74) *Attorney, Agent, or Firm* — Vivacqua Crane, PLLC

(57) ABSTRACT

Systems and methods for diagnosing sensor performance of a UWB sensor localization are provided. The system comprises a UWB tag, at least four UWB anchors, and a gateway. The gateway comprises an ECU arranged to receive sensor signals from the UWB anchors. The ECU comprises a preprocessing module arranged to align the sensor signals defining aligned data and is arranged to determine intersections of the aligned data defining points of intersections. The system further comprises a clustering module arranged to cluster the points of intersections defining at least one cluster of points of the UWB anchors to calculate a clustering quality and a clustering variance of each of the at least one cluster. The ECU is arranged to find a clustering contribution of each anchor defining a first contribution low of one of the anchors and is arranged to determine an erratic anchor based the first contribution low.

20 Claims, 2 Drawing Sheets

SYSTEM AND METHOD FOR DIAGNOSING SENSOR PERFORMANCE OF AN ULTRA WIDE BAND SENSOR LOCALIZATION

INTRODUCTION

The present disclosure relates to systems and methods of diagnosing wireless localization of targets and, more particularly, systems and methods of diagnosing sensor performance of an ultra wide band (UWB) sensor localization for a vehicle.

Wireless localization of mobile targets can be achieved for outdoor environments. However, accuracies may vary for a number of wireless technologies or networks such as Wi-Fi or Bluetooth Low Energy. More specifically, there are inaccuracy issues due to sensor error or failure. Moreover, diagnostic protocols and architectures may not be time efficient and cost effective.

SUMMARY

Thus, while current wireless systems and methods achieve their intended purpose, there is a need for a new and improved system and method of diagnosing sensor performance of an ultra wide band (UWB) sensor localization for a vehicle In accordance with one aspect of the present disclosure, a method of diagnosing sensor performance of a UWB sensor localization for a vehicle is provided. The method comprises receiving sensor signals from at least four UWB anchors and a UWB tag for a time period. The sensor signals represent anchor coordinates and real-time distances between the tag and each anchor. The method further comprises aligning the sensor signals at an aligned timestamp during the time period by way of:

$$\overline{t_{si} + \frac{k}{f_i}} = t_i \text{ when } t_{i-1} \leq t_{si} + \frac{k}{f_i} < t_i$$

where $t_{si}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

In this aspect, the method further comprises determining intersections of the aligned data based on the anchor coordinates and the real-time distances by way of:

$$N_p = \sum_{k=0}^{k=C_N^2} NoI_k$$

where Np is total number of intersections, k is an iteration, $C_N^2$ is an overall number of groups, and $NoI_k$ is a number of intersections between a pair of non-concentric circles of the aligned data to define points of intersections.

The method further comprises clustering the points of intersections by way of:

$$\epsilon = P * \frac{\sum_{i=1}^{n}(\hat{R}_i)}{n} \text{ and } \text{Min}(P) = m^2 + 1$$

where $\epsilon$ is the distance threshold between each point, P is a distance ratio threshold, n is a number of sensors, and $R_i$ is an average distance value of the aligned data from the UWB anchors, Min(P) is the minimum points threshold, and m is a number of signals from the UWB anchors to define at least one cluster of points of the UWB anchors. The method further comprises calculating a clustering quality of each of the at least one cluster by way of:

$$\rho = \frac{1}{e^{\left|N_c - \frac{N_p}{2}\right|}}$$

where $\rho$ is the clustering quality, e is error between a number of points in the at least one cluster, and $N_c$ is a number of points in the at least one cluster.

Further to this aspect, the method comprises determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster. The method further comprises calculating a clustering variance of each of the at least one cluster by way of:

$$\delta = \sqrt{\frac{\sum_{i=0}^{n} p_i - o_c}{n}}$$

where $\delta$ is the clustering variance, $p_i$ is points of the at least one cluster, $o_c$ is a geometric center of each cluster to define a sensed location of the tag for each cluster.

In this aspect, the method further comprises finding a clustering contribution of each anchor by way of the intersections of the aligned data for the at least one cluster when one of the clustering quality is below a normal quality and the clustering variance is above a normal variance to define a first contribution low of one of the anchors. Furthermore, the method comprises determining an erratic anchor based the contribution low.

In one example, the step of determining intersections of the aligned data comprises determining a pair of circles defined by the aligned data of the anchors, each circle having coordinates defined by:

$$cir_i^j : (X-x_i)^2 + (Y-y_i)^2 = (r_i^j)^2,$$

each anchor having coordinates defined by:

$$C_i = (x_i, y_i)$$

the aligned data being denoted as:

$$R_i = r_i^1, r_i^2, \ldots r_i^{mi}$$

where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, and $r_i^j$ is the $j^{th}$ signal of the aligned data of the anchors.

In this example, determining intersections of the aligned data further comprises determining a distance between the pair of circles with:

$$D_{<O_i,O_{i'}>} = \sqrt{(x_i-x_{i'})^2+(y_i-y_{i'})^2},$$

where D is a distance between the pair of circles $O_i$ and $O_i{'}$. Further, the step of determining intersections comprises determining a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

In another example, determining intersections of the aligned data further comprises determining intersection coordinates of the pair of circles with:

$$P^+_{<i,i+1>} = (x+,y+) \text{ and } P^-_{<i,i+1>} = (x-,y-),$$

where $P^+_{<i,i+1>}$ and $P^-_{<i,i+1>}$ are two symmetrical intersections coordinate of two circle $O_i^j$ and $O_{i'}^{j'}$.

In yet another example, determining intersection coordinates of the pair of circles is by way of:

$$x\mathrel{+}= x_i + \frac{a(x_{i+1}-x_i)}{D_{<O_i,O_{i+1}>}} + h*\frac{(y_{i+1}-y_i)}{D_{<O_i,O_{i+1}>}},$$

$$y\mathrel{+}= y_i + \frac{a(y_{i+1}-y_i)}{D_{<O_i,O_{i+1}>}} - h*\frac{(x_{i+1}-x_i)}{D_{<O_i,O_{i+1}>}},$$

$$x\mathrel{-}= x_i + \frac{a(x_{i+1}-x_i)}{D_{<O_i,O_{i+1}>}} - h*\frac{(y_{i+1}-y_i)}{D_{<O_i,O_{i+1}>}}, \text{ and}$$

$$y\mathrel{-}= y_i + \frac{a(y_{i+1}-y_i)}{D_{<O_i,O_{i+1}>}} + h*\frac{(x_{i+1}-x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In still another example, finding the clustering contribution comprises comparing the clustering quality with the normal quality and comparing the clustering variance with the normal variance. In one example, comparing the clustering quality with the normal quality is by way of:

$$Q^* = e^{\frac{1}{\frac{n}{2}-1}}$$

where Q* is the normal quality, e is sensor error, and n is the total number of signals, and wherein comparing the clustering variance with the normal variance is by way of:

$$V^* = -0.0075R^2 + 0.25R - 1.63$$

where V* is the normal variance and R is a target distance. In another example, the normal variance is determined by way of:

$$R = (\Sigma_{i=1}^n \hat{R})/n, X = e^{\mu'+\delta'Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where $95^{th}$ percentile of the lognormal distribution occurs at $\mu'+1.645*\delta'$, $\mu'$ is a mean value in the lognormal distribution, $\delta'$ is a standard deviation in the lognormal distribution.

In another example of this aspect, the method further comprises clustering the points of intersections in at least four groups of at least three UWB anchors by way of:

$$\epsilon = P * \frac{\sum_{i=1}^n (\hat{R}_i)}{n} \text{ and } \text{Min}(P) = m^2 + 1$$

to define at least four cluster groups of points of the UWB anchors. The method further comprises calculating a clustering quality for each of the at least four cluster groups by way of:

$$\rho = \frac{1}{e^{\left|N_c - \frac{N_p}{2}\right|}}$$

to define a grouped clustering quality for each of the at least four cluster groups. The method further comprises determining a geometric center for each of the at least four cluster groups by way of:

$$o_c = \frac{\sum_{i=0}^n p_i}{n}$$

to define a grouped geometric center for each of the at least four cluster groups.

In this example, the method further comprises calculating a clustering variance for each of the at least four cluster groups by way of:

$$\delta = \sqrt{\frac{\sum_{i=0}^n p_i - o_c}{n}}$$

to define a grouped clustering variance for each of the at least four cluster groups. Moreover, the method further comprises finding a grouped clustering contribution for each cluster group by way of the intersections of the aligned data when one of the grouped clustering quality is below the normal quality and the grouped clustering variance is above the normal variance to define a grouped contribution low of one of the anchors in the cluster groups. Furthermore, the method comprises comparing the grouped contribution low of the cluster groups with the first contribution low of one of the anchors wherein the step of determining the erratic anchor is based on a lesser between the grouped contribution low and the first contribution low of one of the anchors.

In this example, finding the grouped clustering contribution comprises comparing the grouped clustering quality with the normal quality; and comparing the grouped clustering variance with the normal variance.

In accordance with another aspect of the present disclosure, a system for diagnosing sensor performance of an ultra wide band (UWB) sensor localization for a vehicle is provided. The system comprises a UWB tag arranged to be mobile and trackable by way of a sensor signal and at least four UWB anchors. Each UWB anchor is in communication with the UWB tag and arranged to receive and send the sensor signal for tracking the UWB tag.

In this aspect, the system further comprises a gateway in communication with the UWB anchor. The gateway comprises an electronic control unit (ECU) arranged to receive sensor signals from at the UWB anchors for a time period. The sensor signals represent anchor coordinates and real-time distances between the tag and each anchor. In this aspect the ECU comprises a preprocessing module and a clustering module.

The preprocessing module is arranged to align the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit thereof to define aligned data. Moreover, the preprocessing module arranged to determine intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2$ is an overall number of groups, and $NoI_k$ is a number of intersections between a pair of non-concentric circles of the aligned data to define points of intersections; and The clustering module is arranged to cluster the points of intersections by way of:

$$\epsilon = P * \frac{\sum_{i=1}^n (\hat{R}_i)}{n} \text{ and } \text{Min}(P) = m^2 + 1$$

where $\epsilon$ is the distance threshold between each point, P is a distance ratio threshold, n is a number of sensors, and $\hat{R}_i$ is an average distance value of the aligned data from the UWB anchors, Min(P) is the minimum points threshold, and m is a number of signals from the UWB anchors to define at least one cluster of points of the UWB anchors.

Moreover, the clustering module is further arranged to determine a geometric center of the at least one cluster by way of:

$$o_c = \frac{\sum_{i=0}^n p_i}{n}$$

where $o_c$ is the geometric center of the at least one cluster, $p_i$ is a point of the at least one cluster, and n is a number of intersections of the at least one cluster, the clustering module further arranged to calculate a clustering quality of each of the at least one cluster by way of:

$$\rho = \frac{1}{e^{\left|N_c - \frac{N_p}{2}\right|}}$$

where $\rho$ is the clustering quality, e is error between a number of points in the at least one cluster, and $N_c$ is a number of points in the at least one cluster.

In this aspect, the clustering module is further arranged to calculate a clustering variance of each of the at least one cluster by way of:

$$\delta = \sqrt{\frac{\sum_{i=0}^n p_i - o_c}{n}}$$

where $\delta$ is the clustering variance, $p_i$ is points of the at least one cluster, $o_c$ is a geometric center of each cluster to define a sensed location of the tag for each cluster.

The ECU is arranged to find a clustering contribution of each anchor by way of the intersections of the aligned data for the at least one cluster when one of the clustering quality is below a normal quality and the clustering variance is above a normal variance to define a first contribution low of one of the anchors. Moreover, the ECU is arranged to determine an erratic anchor based the contribution low.

In one embodiment, the preprocessing module being arranged to determine intersections of the aligned data comprises the preprocessing module arranged to determine a pair of circles defined by the aligned data of the anchors. Each circle has coordinates defined by:

$$cir_i^j : (X-x_i)^2 + (Y-y_i)^2 = (r_i^j)^2,$$

where each anchor has coordinates defined by:

$$C_i = (x_i, y_i), \text{ and}$$

the aligned data is denoted as:

$$R_i = r_i^1, r_i^2, \ldots r_i^{mi},$$

where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors. Moreover, the preprocessing module is arranged to determine a distance between the pair of circles with:

$$D_{<O_i, O_{i'}>} = \sqrt{(x_i - x_{i'})^2 + (y_i - y_{i'})^2},$$

where D is a distance between the pair of circles $O_i$ and $O_i'$. Furthermore, the preprocessing module being arranged to determine a number of intersections between the pair of circles with:

$$NoI_{<O_i^j, O_{i'}^{j'}>} = \begin{cases} 0 & D_{<O_i, O_{i'}>} > r_i^j + r_{i'}^{j'} \\ 1 & D_{<O_i, O_{i'}>} = r_i^j + r_{i'}^{j'} \\ 2 & D_{<O_i, O_{i'}>} < r_i^j + r_{i'}^{j'} \end{cases}$$

where NoI is a number of intersections between the pair of circles.

In another embodiment, the preprocessing module being arranged to determine intersections of the aligned data further comprises the preprocessing module arranged to determine intersection coordinates of the pair of circles with:

$$I^{+}{}_{<i,i+1>}=(x+,y+) \text{ and } I^{-}{}_{<i,i+1>}=(x-,y-),$$

where $I^{+}{}_{<i,i+1>}$ and $I^{-}{}_{<i,i+1>}$ are two symmetrical intersections coordinate of two circle $O_i^j$ and $O_i^{j'}$.

In another embodiment, the preprocessing module being arranged to determine intersection coordinates of the pair of circles is by way of:

$$x+ = x_i + \frac{a(x_{i+1} - x_i)}{D_{<O_i,O_{i+1}>}} + h * \frac{(y_{i+1} - y_i)}{D_{<O_i,O_{i+1}>}},$$

$$y+ = y_i + \frac{a(y_{i+1} - y_i)}{D_{<O_i,O_{i+1}>}} - h * \frac{(x_{i+1} - x_i)}{D_{<O_i,O_{i+1}>}},$$

$$x- = x_i + \frac{a(x_{i+1} - x_i)}{D_{<O_i,O_{i+1}>}} - h * \frac{(y_{i+1} - y_i)}{D_{<O_i,O_{i+1}>}}, \text{ and}$$

$$y- = y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In yet another embodiment, the ECU is arranged to find the clustering contribution comprises the ECU arranged to compare the clustering quality with the normal quality and to compare the clustering variance with the normal variance. Moreover, the ECU is arranged to compare the clustering quality with the normal quality by way of:

$$Q^* = e^{\frac{1}{\frac{n}{2}-1}}$$

where Q* is the normal quality, e is sensor error, and n is the total number of signals, and the ECU is arranged to compare the clustering variance with the normal variance is by way of:

$$V^* = -0.0075R^2 + 0.25R - 1.63$$

where V* is the normal variance and R is a target distance.

In still another embodiment, the normal variance is determined by way of:

$$R = (\Sigma_{i=1}^n \hat{R})/n, X = e^{\mu' + \delta' Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where 95$^{th}$ percentile of the lognormal distribution occurs at $\mu'+1.645*\delta'$, $\mu'$ is a mean value in the lognormal distribution, $\delta'$ is a standard deviation in the lognormal distribution.

In one embodiment, the clustering module is further arranged to cluster the points of intersections in at least four groups of at least three UWB anchors by way of:

$$\epsilon = P * \frac{\sum_{i=1}^n (\hat{R}_i)}{n} \text{ and } \text{Min}(P) = m^2 + 1$$

to define at least four cluster groups of points of the UWB anchors. Moreover, the clustering module is further arranged to calculate a clustering quality for each of the at least four cluster groups by way of:

$$\rho = \frac{1}{e^{\left|N_c - \frac{N_p}{2}\right|}}$$

to define a grouped clustering quality for each of the at least four cluster groups. In this embodiment, the clustering module is further arranged to determine a geometric center for each of the at least four cluster groups by way of:

$$o_c = \frac{\sum_{i=0}^n p_i}{n}$$

to define a grouped geometric center for each of the at least four cluster groups. Moreover, the clustering module is further arranged to calculate a clustering variance for each of the at least four cluster groups by way of:

$$\delta = \sqrt{\frac{\sum_{i=0}^n p_i - o_c}{n}}$$

to define a grouped clustering variance for each of the at least four cluster groups.

Further to this embodiment, the ECU is further arranged to find a grouped clustering contribution for each cluster group by way of the intersections of the aligned data when one of the grouped clustering quality is below the normal quality and the grouped clustering variance is above the normal variance to define a grouped contribution low of one of the anchors in the cluster groups. Additionally, the ECU is further arranged to compare the grouped contribution low of the cluster groups with the first contribution low of one of the anchors. Furthermore, the ECU is further arranged to determine the erratic anchor is based on a lesser between the grouped contribution low and the first contribution low of one of the anchors.

In another embodiment, the ECU being arranged to find the grouped clustering contribution comprises the ECU further arranged to compare the grouped clustering quality with the normal quality and compare the grouped clustering variance with the normal variance.

In accordance with yet another aspect of the present disclosure, a method of diagnosing sensor performance of an ultra wide band (UWB) sensor localization for a vehicle is provided. The method comprises receiving sensor signals from at least four UWB anchors and a UWB tag for a time period. The sensor signals represent anchor coordinates and real-time distances between the tag and each anchor.

The method further comprises aligning the sensor signals at an aligned timestamp during the time period to define aligned data. The method further comprises determining intersections of the aligned data based on the anchor coordinates and the real-time distances to define points of intersections.

In this aspect, the method further comprises clustering the points of intersections to define at least one cluster of points of the UWB anchors.

Moreover, the method further comprises calculating a clustering quality of each of the at least one cluster. In this aspect, the method comprises determining a geometric center of the at least one cluster.

Additionally, the method comprises calculating a clustering variance of each of the at least one cluster. The method further comprises comparing the clustering quality with a normal quality.

In this aspect, the method further comprises comparing the clustering variance with a normal variance. The method further comprises finding a clustering contribution of each anchor by way of the intersections of the aligned data for the at least one cluster when one of the clustering quality is below the normal quality and the clustering variance is above the normal variance to define a first contribution low of one of the anchors. Furthermore, the method comprises determining an erratic anchor based the contribution low.

In one example, the method further comprises clustering the points of intersections in at least four groups of at least three UWB anchors to define at least four cluster groups of points of the UWB anchors. The method further comprises calculating a clustering quality for each of the at least four cluster groups to define a grouped clustering quality for each of the at least four cluster groups. Moreover, the method comprises determining a geometric center for each of the at least four cluster groups to define a grouped geometric center for each of the at least four cluster groups.

In this example, the method further comprises calculating a clustering variance for each of the at least four cluster groups to define a grouped clustering variance for each of the at least four cluster groups. Additionally, the method further comprises finding a grouped clustering contribution for each cluster group by way of the intersections of the aligned data when one of the grouped clustering quality is below the normal quality and the grouped clustering variance is above the normal variance to define a grouped contribution low of one of the anchors in the cluster groups. Furthermore, the method further comprises comparing the grouped contribution low of the cluster groups with the first contribution low of one of the anchors wherein determining the erratic anchor is based on a lesser between the grouped contribution low and the first contribution low of one of the anchors.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure are systems and methods for diagnosing sensor performance for a UWB sensor localization of a vehicle The systems and methods described herein improve UWB technology related to diagnosing sensor error during localization of a mobile target, such as a key fob. The systems and methods of the present disclosure minimize or exclude noise data caused by sensor error when determining a real-time location of a UWB tag, thereby improving localization accuracy and reducing computation costs of UWB technology.

Figure 1:
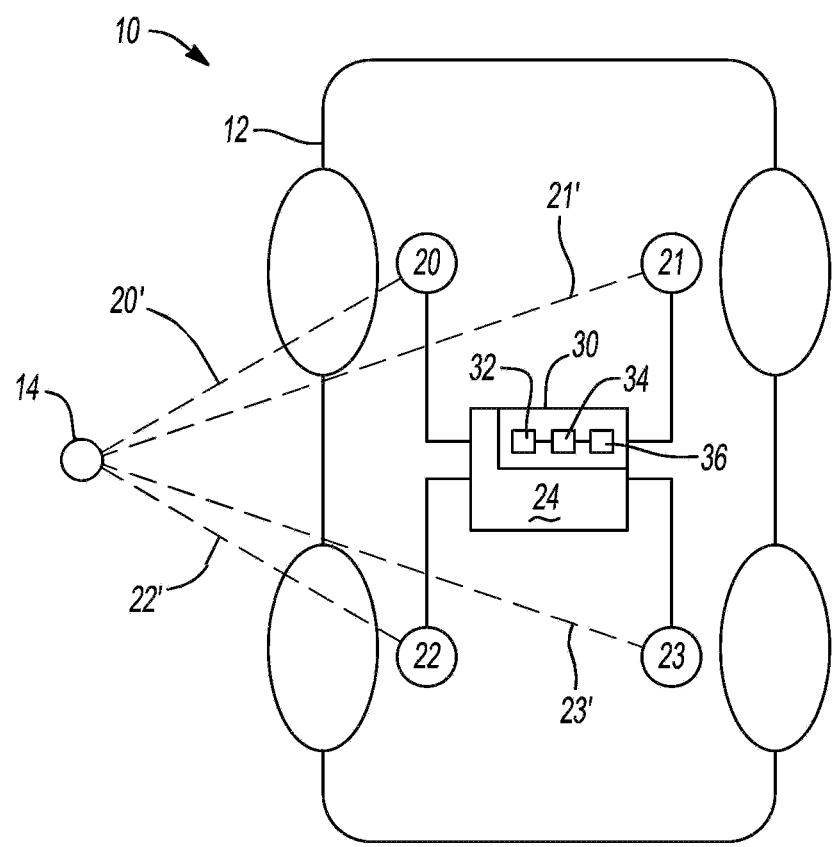
FIG. 1 is a schematic view of a system for diagnosing sensor performance of an ultra wide band (UWB) sensor localization for a vehicle in accordance with one embodiment of the present disclosure.

FIG. 1 illustrates a system 10 for diagnosing sensor performance for a UWB sensor localization of a vehicle in accordance with one embodiment of the present disclosure. It is to be understood that the system 10 uses a short-range wireless communication protocol UWB having a range of frequency from about 3.1 GHz to about 10.5 GHz. Moreover, the system 10 has UWB sensors which may operate in two modes, namely anchor and tag. As shown, the system 10 comprises a mobile UWB tag 14 arranged to be trackable by at least four UWB anchors via a sensor signal, preferably a plurality of sensor signals. In this embodiment, the system 10 has four anchors 20-23 mounted on or fixed to the vehicle 12. Moreover, the UWB tag 14 is a mobile sensor and is moveably remote from the vehicle 12. The UWB tag 14 is arranged to receive and send sensor signals 20'-23' for tracking the UWB tag 14. Moreover, each UWB anchor is in communication with the UWB tag 14, and arranged to receive and send sensor signals 20'-23' for data and tracking of the UWB tag 14.

In this example, each pair of sensors (anchor and tag) communicate by way of a sender-receiver model. Hence, a simple distance measurement strategy may be implemented. In this example, the tag initializes a two-way-ranging (TWR) by sending a poll message signal to the anchor. Next, the anchor records the time of reception and sends a response message signals to the tag. Using a time of flight (ToF) approach, the tag receives the response message and determines the ToF based on an overall time span $T_{loop}$ and a processing time span $T_{reply}$ as follows:

$ToF=(T_{loop}-T_{reply})/2$. In turn, an estimated distance of the tag may be calculated by multiplying ToF to the speed of light by way of:

$$\text{Estimated distance} = ToF \times (3 \times 10^8 m/s).$$

The system 10 further comprises a gateway 24 in communication with the UWB anchors 20-23 and UWB tag 14. Moreover, the gateway 24 is arranged to be communicable with a cloud server (not shown) as desired. The gateway 24 comprises an electronic control unit (ECU) or processor 30 arranged to receive and send sensor signals 20'-23' to and from the UWB anchors 20-23 and UWB tag 14 for a time period. In this embodiment, the sensor signals 20'-23' comprise or represent anchor coordinates and real-time distances between the tag and each anchor.

It is to be understood that the ECU 30 comprises software and a number of modules arranged to run algorithms to calculate, compute, and determine values to assist in the operation of the system 10 as discussed in greater detail below. In this embodiment, the ECU 30 comprises a preprocessing module 32 arranged to align the sensor signals 20'-23' at an aligned timestamp during the time period by way of:

$$\overline{t_{s_i} + \frac{k}{f_i}} = t_i \text{ when } t_{i-1} \leq t_{s_i} + \frac{k}{f_i} < t_i.$$

As shown, $t_{si}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

Moreover, the preprocessing module 32 is arranged to determine intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

To compute the total number of intersections $N_p$, the preprocessing module 32 is arranged to determine a pair of circles defined by the aligned data of the anchors. Each circle has coordinates with respect to a current distance $r_i^j$ from the tag defined by:

$cir_i^j:(X-x_i)^2+(Y-y_i)^2=(r_i^j)^2$. It is understood that each anchor has coordinates defined by: $C_i=(x_i, y_i)$ and the aligned data is denoted as: $R_i=r_i^1, r_i^2, \ldots r_i^{mi}$. As shown, $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, and $r_i^j$ is the $j^{th}$ signal of the aligned data of the anchors and representing the current distance.

Moreover, the preprocessing module 32 is arranged to determine a distance between the pair of circles with:

$D_{<O_i,O_{i'}>}=\sqrt{(x_i-x_{i'})^2+(y_i-y_{i'})^2}$. As shown, D is a distance between the pair of circles $O_i$ and $O_i'$. In addition, the preprocessing module 32 is arranged to determine a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

To further determine intersections of the aligned data, the preprocessing module 32 is arranged to determine intersection coordinates of the pair of circles with: $I^+_{<i,i+1>}=(x+,y+)$ and $I^-_{<i,i+1>}=(x-,y-)$. It is understood that $I^+_{<i,i+1>}$ and $I^-_{<i,i+1>}$ are two symmetrical intersections coordinate of circle $O_i^j$ and circle $O_i^{j'}$. More specifically, the preprocessing module 32 is arranged to determine intersection coordinates of the pair of circles is by way of:

$$x+ = x_i + \frac{a(x_{i+1} - x_i)}{D_{<O_i,O_{i+1}>}} + h * \frac{(y_{i+1} - y_i)}{D_{<O_i,O_{i+1}>}},$$

$$y+ = y_i + \frac{a(y_{i+1} - y_i)}{D_{<O_i,O_{i+1}>}} - h * \frac{(x_{i+1} - x_i)}{D_{<O_i,O_{i+1}>}},$$

$$x- = x_i + \frac{a(x_{i+1} - x_i)}{D_{<O_i,O_{i+1}>}} - h * \frac{(y_{i+1} - y_i)}{D_{<O_i,O_{i+1}>}}, \text{ and}$$

$$y- = y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In this embodiment, the ECU 30 further comprises a clustering module 34 arranged to cluster the points of intersections. In one example, the clustering module 34 deploys or implements a density-based spatial clustering (DBSCAN) algorithm to perform computations of certain parameters. Such DBSCAN algorithm may be implemented for calculations of:

$$\epsilon = P * \frac{\sum_{i=1}^n (\hat{R}_i)}{n}$$

and $Min(P)=m^2+1$. As shown, $\epsilon$ is the distance threshold between each point, P is a distance ratio threshold, n is a number of sensors, $R_i$ an average distance value of the aligned data from the UWB anchors, Min(P) is the minimum points threshold, and m is a number of signals from the UWB anchors to define at least one cluster of points of the UWB anchors.

Additionally, the clustering module 34 is arranged to calculate a clustering quality and a clustering variance of each of the at least one cluster. In one example, the DBSCAN algorithm may be implemented to perform computations of certain performance indicators. That is, the DBSCAN algorithm may be implemented for calculations of:

$$\rho = \frac{1}{e^{\left|N_c - \frac{N_p}{2}\right|}} \text{ and } \delta = \sqrt{\frac{\sum_{i=0}^n p_i - o_c}{n}},$$

where $\rho$ is the clustering quality, e is error between a number of points in the at least one cluster, $N_c$ is a number of points in the at least one cluster, δ is the clustering variance, $p_i$ is points of the at least one cluster, $o_c$ is a geometric center of each cluster.

Furthermore, the clustering module 34 is further arranged to determine a geometric center of the at least one cluster by way of:

$$o_c = \frac{\sum_{i=0}^{n} p_i}{n}.$$

As provided, $o_c$ is the geometric center of the at least one cluster, $p_i$ is a point of the at least one cluster, and n is a number of intersections of the at least one cluster to define a sensed location of the tag for each cluster.

In this embodiment, the ECU 30 may further comprise a Bayesian module 36 arranged to determine a real-time location of the tag 14 based on a Bayesian probability function to match the sensed location with a predicted location of the tag by way of:

$$L_t = \rho*(f_c(L_t^s)) + (1-\rho)*f_{mov}(L_{t-1}, v, \theta) \text{ and}$$

$$p = \rho * \left(1 - \frac{\arctan(\delta)}{\pi/2}\right).$$

As provided, $L_t$ is the real-time location at timestamp t, ρ is a normalized location parameter, $f_{bay}$ is the Bayesian probability function, $L_t^s$ is the sensed location for each cluster at timestamp t, $L_t^p$ is the predicted location, v is tag moving speed, θ is tag moving direction, ρ is cluster quality of the at least one cluster, and δ is cluster variance of the at least one cluster.

To determine the real-time location of the tag 14, the Bayesian module 36 is arranged to calculate a sensed probability of each sensed location for each cluster by way of:

$$P_t^{S_i} = \frac{N_{ci}}{\sum_{j=1}^{S}(N_{cj})}.$$

It is understood that $P_t^{S_i}$ is the sensed probability, $N_{ci}$ is a number of points in one of the clusters, and $N_{cj}$ is a point in the one of the clusters. Moreover, the Bayesian module 36 is arranged to compare each sensed location with a predicted location of the tag to identify error by way of:

$$E = \sum_{j=1}^{n}(e_t^{s_j}).$$

As provided, the predicted location is based on the aligned data of the UWB anchors, the E is total error for each cluster and $e_t^{sj}$ is error between the sensed location $L_t^s$ and the predicted location $L_t^p$.

Furthermore, the Bayesian module 36 is arranged to rank each sensed location based on one of highest sensed probability and least amount of error (between the sensed location and the predicted location) to define a real-time location of the tag 14. In turn, results of the highest sensed probability and the least amount of error factor out noise caused by an outdoor environment. That is, noise data caused by the outdoor environment are excluded or minimized when determining the real-time location of the UWB tag 14, thereby improving localization accuracy of UWB technology.

Although a Bayesian module implementing a Bayesian probability function is provided herein, it is to be understood that any other suitable module, function, or algorithm may be used to determine the predicted location, the sensed probability, and the real-time location without departing from the spirit or scope of the present disclosure.

Referring to FIG. 1, the ECU 30 is further arranged to find a clustering contribution of each anchor 20-23 by way of the intersections of the aligned data for the at least one cluster when one of the clustering quality is below a normal quality and the clustering variance is above a normal variance to define a first contribution low of one of the anchors. That is, the ECU is arranged to conduct a performance verification with respect to the clustering quality and the clustering variance.

More specifically, in the performance verification, the ECU 30 is arranged to compare the clustering quality to the normal quality (discussed below) and arranged to compare the clustering variance with the normal variance (discussed below). In the performance verification, the ECU is arranged to compare the clustering quality with the normal quality by way of:

$$Q^* = e^{\frac{1}{\frac{n}{2}-1}}$$

where Q* is the normal quality, e is sensor error, and n is the total number of signals, and wherein the ECU 30 being arranged to compare the clustering variance with the normal variance is by way of:

$$V^* = -0.0075R^2 + 0.25R - 1.63$$

where V* is the normal variance and R is a target distance.

Additionally, the normal variance is determined by way of:

$$R = (\Sigma_{i=1}^{n}\hat{R})/n, X = e^{\mu'+\delta'Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where $95^{th}$ percentile of the lognormal distribution occurs at μ'+1.645*δ', μ' is a mean value in the lognormal distribution, δ is a standard deviation in the lognormal distribution.

In this embodiment, if either the clustering quality is below the normal quality or the clustering variance is above the normal variance, then the ECU 30 is arranged to find the clustering contribution of each anchor by way of the intersections of the aligned data for the at least one cluster. In one example, the clustering contribution may be found by mapping back to each sensor (anchor) via the intersections of the aligned data for the at least one cluster with:

$$I_{<i,i+1>}^{j+} = (x+, y+) \text{ and } I_{<i,i+1>}^{j-} = (x-, y-), N_p = \sum_{k=0}^{k=C_N^2} NoI_k$$

and its derivatives as provided above. Moreover, a lowest contribution count of a sensor in the at least one cluster defines the first contribution low. Furthermore, if both the clustering quality is above the normal quality and the clustering variance is below the normal variance, then negligible sensor error is concluded.

In this embodiment, the ECU 30 is arranged to determine an erratic anchor based on the lowest cluster contribution of a sensor. In this embodiment, the lowest cluster contribution of a sensor for the at least one cluster defines the first contribution low. Hence, the erratic sensor is identified to be the sensor with the lowest cluster contribution in the at least one cluster. In turn, a number of protocols may be triggered or put in place as desired. For example, the ECU may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

In accordance with another embodiment, the system 10 comprises the clustering module further arranged to cluster the points of intersections in at least four groups of at least three UWB anchors by way of:

$$\epsilon = P * \frac{\sum_{i=1}^{n}(\hat{R}_i)}{n} \text{ and } \text{Min}(P) = m^2 + 1$$

to define at least four cluster groups of points of the UWB anchors. For example, system 10 comprises four anchors 20, 21, 22, 23 thereby defining four cluster groups: 20-21-22, 20-21-23, 20-22-23, and 21-22-23. The cluster groups may be categorized as groups A, B, C, and D, respectively.

Moreover, the clustering module 34 is further arranged to calculate a clustering quality for each of the at least four cluster groups (here, four total) by way of:

$$\rho = \frac{1}{e^{\left|N_c - \frac{N_p}{2}\right|}}$$

to define a grouped clustering quality for each of the at least four cluster groups. In this embodiment, the clustering module 34 is further arranged to determine a geometric center for each of the at least four cluster groups by way of:

$$o_c = \frac{\sum_{i=0}^{n} p_i}{n}$$

to define a grouped geometric center for each of the at least four cluster groups (here, A-D). Moreover, the clustering module 34 is further arranged to calculate a clustering variance for each of the at least four cluster groups by way of:

$$\delta = \sqrt{\frac{\sum_{i=0}^{n} p_i - o_c}{n}}$$

to define a grouped clustering variance for each of the at least four cluster groups.

Further to this embodiment, the ECU 30 is further arranged to find a grouped clustering contribution for each anchor of its respective cluster group by way of the intersections of the aligned data when one of the grouped clustering quality is below the normal quality and the grouped clustering variance is above the normal variance to define a grouped contribution low of one of the anchors in the cluster groups. That is, the ECU 30 is arranged to conduct a performance verification with respect to the grouped clustering quality and the grouped clustering variance.

More specifically, in the performance verification, the ECU 30 is arranged to compare the grouped clustering quality to the normal quality (discussed below) and arranged to compare the grouped clustering variance with the normal variance (discussed below) of each cluster group. In addition, the ECU is arranged to compare the grouped clustering quality with the normal quality by way of:

$$Q^* = e^{\frac{1}{\frac{n}{2}-1}}$$

and the ECU is arranged to compare the grouped clustering variance with the normal variance is by way of:

$$V^* = -0.0075R^2 + 0.25R - 1.63$$

Additionally, the normal variance is determined by way of:

$$R = (\Sigma_{i=1}^{n} \hat{R})/n, X = e^{\mu' + \delta' z},$$

$$Z(0.95) = 1.645,$$

$$\mu' = -0.0075R^2 + 0.23R - 2.72, \text{ and}$$

$$\delta' = 0.014R + 0.39,$$

In this embodiment, if either the grouped clustering quality is below the normal quality or the grouped clustering variance is above the normal variance, then the ECU is arranged to find the grouped clustering contribution of each anchor by way of the intersections of the aligned data. In one example, the grouped clustering contribution may be found by mapping back to each sensor (anchor) via the intersections of the aligned data for any of the at least four cluster groups with:

$$I_{<i,i+1>}^{j+} = (x+, y+) \text{ and } I_{<i,i+1>}^{j-} = (x-, y-), N_p = \sum_{k=0}^{k=C_N^2} NoI_k$$

and its derivatives as provided above. Moreover, a lowest contribution count of a sensor in the at least four cluster groups defines the grouped contribution low. Furthermore, if both the grouped clustering quality is above the normal quality and the grouped clustering variance is below the normal variance, then negligible sensor error is concluded.

Additionally in this embodiment, the ECU 30 is further arranged to compare the grouped contribution low with the first contribution low.

As in the previous embodiment, the ECU 30 is arranged to determine an erratic anchor based on the lowest cluster contribution of a sensor. In this embodiment, this ECU 30 is arranged to determine the erratic anchor based on a lesser between the grouped contribution low and the first contribution low of one of the anchors. Hence, the erratic sensor is identified to be the sensor with the lowest cluster contribution in the at least one cluster. In turn, a number of protocols may be triggered or put in place as desired. For example, the ECU may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

Figure 2:
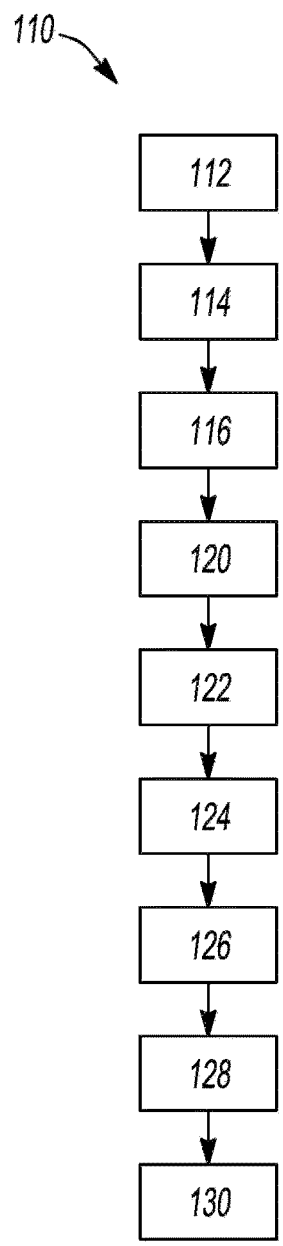
FIG. 2 is a flowchart of a method for diagnosing sensor performance of a UWB sensor localization for a vehicle in accordance with one example of the present disclosure.

FIG. 2 depicts a flowchart for a method 110 of diagnosing sensor performance for a UWB sensor localization of a vehicle 12 in accordance with one embodiment of the present disclosure. In this example, the system 10 of FIG. 1 implements steps of the method 110 discussed in greater detail below. Moreover, it is to be understood that the ECU 30 of system 10 may comprise a number of modules (see above) arranged to run algorithms and formulas to calculate, compute, and determine values to assist in achieving the steps of the method 110.

As shown in block 112, the method 110 comprises receiving sensor signals from at least three UWB anchors and a UWB tag for a time period. As in the system 10, the sensor signals 20'-23' represent anchor coordinates and real-time distances between the tag and each anchor.

In block 114, the method 110 further comprises aligning the sensor signals 20'-23' at an aligned timestamp during the time period by way of:

$$\overline{t_{s_i} + \frac{k}{f_i}} = t_i \text{ when } t_{i-1} \leq t_{s_i} + \frac{k}{f_i} < t_i.$$

As provided, $t_{si}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

As provided in block 116, the method 110 further comprises determining intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

For example, the step of determining intersections of the aligned data comprises determining a pair of circles defined by the aligned data of the anchors 20-23. Each circle has coordinates with respect to a current distance $r_i^j$ from the tag defined by:

$cir_i^j:(X-x_i)^2+(Y-y_i)^2=(r_i^j)^2$. It is understood that each anchor has coordinates defined by: $C_i=(x_i, y_i)$, the aligned data being denoted as: $R_i=r_i^1, r_i^2, \ldots r_i^{mi}$. It is understood that $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors and represents the current distance.

Moreover, the step of determining intersections of the aligned data further comprises determining a distance between the pair of circles with: $D_{<O_i,O_{i'}>} = \sqrt{(x_i-x_{i'})^2+(y_i-y_{i'})^2}$, where D is a distance between the pair of circles $O_i$ and $O_{i'}$, and determining a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases},$$

where NoI is a number of intersections between the pair of circles.

In this example, the step of determining intersections of the aligned data further comprises determining intersection coordinates of the pair of circles with: $P^+_{<i,i+1>}=(x+,y+)$ and $P^-_{<i,i+1>}=(x-,y-)$. It is understood that $P^+_{<i,i+1>}$ and $P^-_{<i,i+1>}$ are two symmetrical intersections coordinate of circle $O_i^j$ and circle $O_i^{j'}$.

To determine intersection coordinates of the pair of circles, the preprocessing module 32 may compute by way of:

$$x+ = x_i + \frac{a(x_{i+1} - x_i)}{D_{<O_i,O_{i+1}>}} + h * \frac{(y_{i+1} - y_i)}{D_{<O_i,O_{i+1}>}},$$

$$y+ = y_i + \frac{a(y_{i+1} - y_i)}{D_{<O_i,O_{i+1}>}} - h * \frac{(x_{i+1} - x_i)}{D_{<O_i,O_{i+1}>}},$$

$$x- = x_i + \frac{a(x_{i+1} - x_i)}{D_{<O_i,O_{i+1}>}} - h * \frac{(y_{i+1} - y_i)}{D_{<O_i,O_{i+1}>}}, \text{ and}$$

$$y- = y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In block 120, the method 110 further comprises clustering the points of intersections by way of:

$$\epsilon = P * \frac{\sum_{i=1}^{n}(\hat{R}_i)}{n} \text{ and } Min(P) = m^2 + 1.$$

As shown, ϵ is the distance threshold between each point, P is a distance ratio threshold, n is a number of sensors, and $R_i$ is an average distance value of the aligned data from the UWB anchors, Min(P) is the minimum points threshold, and m is a number of signals from the UWB anchors to define at least one cluster of points of the UWB anchors 20-23.

In block 122, the method 110 further comprises calculating a clustering quality of each of the at least one cluster by way of:

$$\rho = \frac{1}{e^{\left|N_c - \frac{N_p}{2}\right|}}$$

where ρ is the clustering quality, e is error between a number of points in the at least one cluster, and $N_c$ is a number of points in the at least one cluster.

In block 124, the method 110 comprises determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster.

In block 126, the method further comprises calculating a clustering variance of each of the at least one cluster by way of:

$$\delta = \sqrt{\frac{\sum_{i=0}^{n} p_i - o_c}{n}}$$

where δ is the clustering variance, $p_i$ is points of the at least one cluster, $o_c$ is a geometric center of each cluster to define a sensed location of the tag for each cluster.

In this example, the method 110, by way of the ECU 30, may include a Bayesian module 36 to determine a real-time location of the tag 14 based on a Bayesian probability function to match the sensed location with a predicted location of the tag by way of:

$$L_t = p * (f_c(L_t^s)) + (1 - p) * f_{mov}(L_{t-1}, v, \theta)$$

and $$p = \rho * \left(1 - \frac{\arctan(\delta)}{\pi/2}\right),$$

as discussed in the system 10 above.

As in system 10 above, to determine the real-time location of the tag 14, the Bayesian module 36 calculates a sensed probability of each sensed location for each cluster by way of:

$$p_t^{s_i} = \frac{N_{c_j}}{\sum_{j=1}^{s}(N_{c_j})}.$$

Moreover, the Bayesian module 36 compares each sensed location with a predicted location of the tag to identify error by way of:

$$E = \sum_{j=1}^{n}(e_t^{s_j}).$$

Furthermore, the Bayesian module 36 ranks each sensed location based on one of highest sensed probability and least amount of error (between the sensed location and the predicted location) to define a real-time location of the tag 14. That is, noise data caused by the outdoor environment are excluded or minimized when determining the real-time location of the UWB tag 14, thereby improving localization accuracy of UWB technology.

Although the Bayesian module implementing a Bayesian probability function is provided herein, it is to be understood that any other suitable module, function, or algorithm may be used to determine the predicted location, the sensed probability, and the real-time location without departing from the spirit or scope of the present disclosure.

In block 128, the method 110 further comprises finding a clustering contribution of each anchor 20-23 by way of the intersections of the aligned data for the at least one cluster when one of the clustering quality is below a normal quality and the clustering variance is above a normal variance to define a first contribution low of one of the anchors. By way of the ECU 30, the method 110 performs a performance verification with respect to the clustering quality and the clustering variance.

More specifically, in the performance verification, the ECU 30 compares the clustering quality to the normal quality (discussed below) and compares the clustering variance with the normal variance (discussed below). As discussed in system 10 above, the ECU compares the clustering quality with the normal quality by way of:

$$Q* = e^{\frac{1}{\frac{n}{2}-1}}$$

where Q* is the normal quality, e is sensor error, and n is the total number of signals, and wherein the ECU 30 is arranged to compare the clustering variance with the normal variance is by way of:

$$V* = -0.0075R^2 + 0.25R - 1.63$$

where V* is the normal variance and R is a target distance.

Additionally, the normal variance is determined by way of:

$$R = (\Sigma_{i=1}^{n} \hat{R})/n, X = e^{\mu' + \delta' Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where $95^{th}$ percentile of the lognormal distribution occurs at μ+1.645*δ', μ' is a mean value in the lognormal distribution, δ' is a standard deviation in the lognormal distribution.

In this example, if either the clustering quality is below the normal quality or the clustering variance is above the normal variance, then the ECU 30 finds the clustering contribution of each anchor by way of the intersections of the aligned data for the at least one cluster. In one example, the clustering contribution may be found by mapping back to each sensor (anchor) via the intersections of the aligned data for the at least one cluster with:

$$I^{j+}_{<i,i+1>} = (x+, y+) \text{ and } I^{j-}_{<i,i+1>} = (x-, y-),$$

$$N_p = \sum_{k=0}^{k=C_N^2} NoI_k$$

and its derivatives as provided above. Moreover, a lowest contribution count of a sensor in the at least one cluster defines the first contribution low. Furthermore, if both the clustering quality is above the normal quality and the clustering variance is below the normal variance, then negligible sensor error is concluded.

Furthermore, in block 130, the method 110 comprises determining an erratic anchor based on the lowest cluster contribution of a sensor. In this embodiment, the lowest cluster contribution of a sensor for the at least one cluster defines the first contribution low. Hence, the erratic sensor is identified to be the sensor with the lowest cluster contribution in the at least one cluster. In turn, a number of protocols may be triggered or put in place as desired. For example, the method may include powering-off the erratic sensor or excluding data signals therefrom. Additionally, the method may include sending a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

Figure 3:
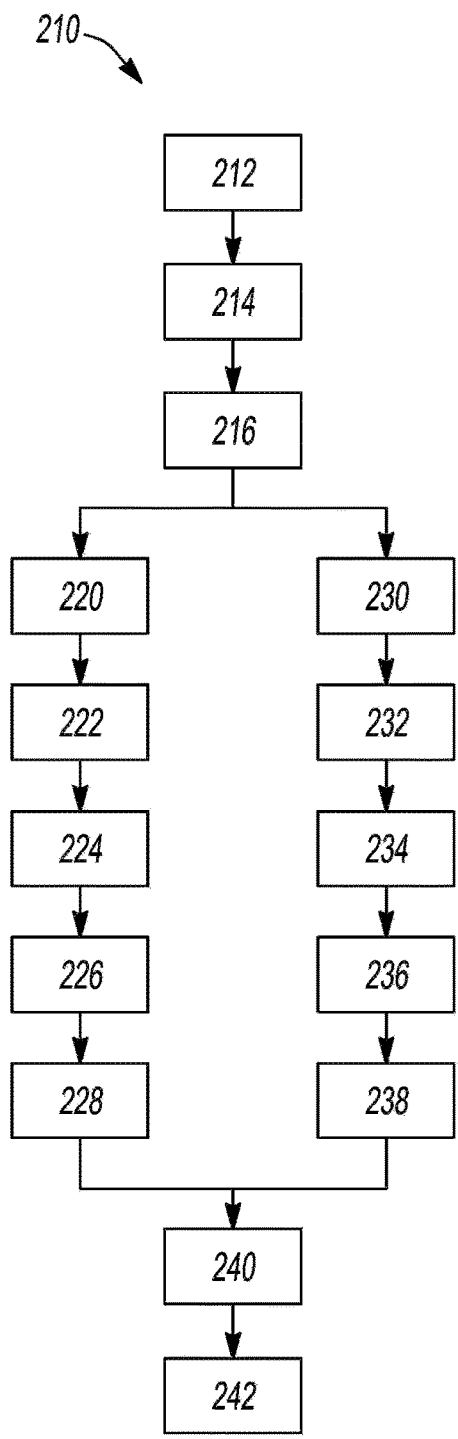
FIG. 3 is a flowchart of a method for diagnosing sensor performance of a UWB sensor localization for a vehicle in accordance with another example of the present disclosure.

FIG. 3 depicts a flowchart for a method 210 of diagnosing sensor performance for a UWB sensor localization of a vehicle in accordance with another example of the present disclosure. In this example, the system 10 of FIG. 1 implements steps of the method 210 discussed in greater detail below. Moreover, it is to be understood that the ECU 30 of system 10 may comprise a number of modules (see above) arranged to run algorithms and formulas to calculate, compute, and determine values to assist in achieving the steps of the method 210.

As shown in block 212, the method 210 comprises receiving sensor signals from at least three UWB anchors and a UWB tag for a time period. As in the system 10, the sensor signals 20'-23' represent anchor coordinates and real-time distances between the tag and each anchor.

In block 214, the method 110 further comprises aligning the sensor signals 20'-23' at an aligned timestamp during the time period by way of:

$$t_{s_i} + \frac{k}{f_i} = t_i \text{ when } t_{i-1} \le t_{s_i} + \frac{k}{f_i} < t_i.$$

As provided, $t_{s_i}$ is an initial timestamp of the time period, k is a number of timestamps of the time period, $f_i$ is a fixed data uploading frequency, $t_i$ is the aligned timestamp, and $t_{s_i}+k/f_i$ is at an upper limit thereof to define aligned data.

As provided in block 216, the method 210 further comprises determining intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

For example, the step of determining intersections of the aligned data comprises determining a pair of circles defined by the aligned data of the anchors 20-23. Each circle has coordinates with respect to a current distance $r_i^j$ from the tag defined by:

$$cir_i^j:(X-x_i)^2+(Y-y_i)^2=(r_i^j)^2.$$

It is understood that each anchor has coordinates defined by: $C_i=(x_i, y_i)$, the aligned data being denoted as: $R_i=r_i^1, r_i^2, \ldots r_i^{mi}$. It is understood that $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors and represents the current distance.

Moreover, the step of determining intersections of the aligned data further comprises determining a distance between the pair of circles with:

$$D_{<O_i,O_{i'}>} = \sqrt{(x_i-x_{i'})^2+(y_i-y_{i'})^2},$$

where D is a distance between the pair of circles $O_i$ and $O_i'$, and determining a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases},$$

where NoI is a number of intersections between the pair of circles.

In this example, the step of determining intersections of the aligned data further comprises determining intersection coordinates of the pair of circles with:

$$I^+_{<i,i+1>}=(x+,y+) \text{ and } I^-_{<i,i+1>}=(x-,y-)$$

It is understood that $I^+_{<i,i+1>}$ and $I^-_{<i,i+1>}$ are two symmetrical intersections coordinate of circle $O_i^j$ and circle $O_i^{j'}$.

To determine intersection coordinates of the pair of circles, the preprocessing module 32 may compute by way of:

$$x+ = x_i + \frac{a(x_{i+1}-x_i)}{D_{<O_i,O_{i+1}>}} + h*\frac{(y_{i+1}+y_i)}{D_{<O_i,O_{i+1}>}},$$

$$y+ = y_i + \frac{a(y_{i+1} - y_i)}{D_{<O_i,O_{i+1}>}} - h * \frac{(x_{i+1} + x_i)}{D_{<O_i,O_{i+1}>}},$$

$$x- = x_i + \frac{a(x_{i+1} - x_i)}{D_{<O_i,O_{i+1}>}} - h * \frac{(y_{i+1} + y_i)}{D_{<O_i,O_{i+1}>}}, \text{ and}$$

$$y- = y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}}$$

and $$h = \sqrt{(r_{i+1}^j)^2 - \frac{2}{a}},$$

respectively.

In block 220, the method 210 further comprises clustering the points of intersections by way of:

$$\epsilon = P * \frac{\sum_{i=1}^{n}(\hat{R}_i)}{n}$$

and $$\text{Min}(P) = m^2 + 1.$$

As shown, $\epsilon$ is the distance threshold between each point, P is a distance ratio threshold, n is a number of sensors, and $R_i$ is an average distance value of the aligned data from the UWB anchors, Min(P) is the minimum points threshold, and m is a number of signals from the UWB anchors to define at least one cluster of points of the UWB anchors 20-23.

In block 222, the method 210 further comprises calculating a clustering quality of each of the at least one cluster by way of:

$$\rho = \frac{1}{e^{|N_c - \frac{N_p}{2}|}}$$

where ρ p is the clustering quality, e is error between a number of points in the at least one cluster, and $N_c$ is a number of points in the at least one cluster.

In block 224, the method 210 comprises determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster.

In block 226, the method further comprises calculating a clustering variance of each of the at least one cluster by way of:

$$\delta = \sqrt{\frac{\sum_{i=0}^{n} p_i - o_c}{n}}$$

where δ is the clustering variance, $p_i$ is points of the at least one cluster, $o_c$ is a geometric center of each cluster to define a sensed location of the tag for each cluster.

In this example, the method, by way of the ECU 30, may include a Bayesian module 36 to determine a real-time location of the tag 14 based on a Bayesian probability function to match the sensed location with a predicted location of the tag by way of:

$$L_t = p * (f_c(L_t^s)) + (1 - p) * f_{mov}(L_{t-1}, v, \theta)$$

and $$p = \rho * \left(1 - \frac{\arctan(\delta)}{\pi/2}\right),$$

as discussed in the system 10 above.

As in system 10 above, to determine the real-time location of the tag 14, the Bayesian module 36 calculates a sensed probability of each sensed location for each cluster by way of:

$$P_t^{s_i} = \frac{N_{c_i}}{\sum_{j=1}^{s}(N_{c_j})}.$$

Moreover, the Bayesian module 36 compares each sensed location with a predicted location of the tag to identify error by way of:

$$E = \sum_{j=1}^{n}(e_t^{s_j}).$$

Furthermore, the Bayesian module 36 ranks each sensed location based on one of highest sensed probability and least amount of error (between the sensed location and the predicted location) to define a real-time location of the tag 14. That is, noise data caused by the outdoor environment are excluded or minimized when determining the real-time location of the UWB tag 14, thereby improving localization accuracy of UWB technology.

Although the Bayesian module implementing a Bayesian probability function is provided herein, it is to be understood that any other suitable module, function, or algorithm may be used to determine the predicted location, the sensed probability, and the real-time location without departing from the spirit or scope of the present disclosure.

In block 228, the method 210 further comprises finding a clustering contribution of each anchor 20-23 by way of the intersections of the aligned data for the at least one cluster when one of the clustering quality is below a normal quality and the clustering variance is above a normal variance to define a first contribution low of one of the anchors. By way of the ECU 30, the method 210 performs a performance verification with respect to the clustering quality and the clustering variance.

More specifically, in the performance verification, the ECU 30 compares the clustering quality to the normal quality (discussed below) and compares the clustering variance with the normal variance (discussed below). As discussed in system 10 above, the ECU compares the clustering quality with the normal quality by way of:

$$Q^* = e^{\frac{1}{\frac{n}{2}-1}}$$

where Q* is the normal quality, e is sensor error, and n is the total number of signals, and wherein the ECU compares the clustering variance with the normal variance is by way of:

$$V^* = -0.0075R^2 + 0.25R - 1.63$$

where V* is the normal variance and R is a target distance.

Additionally, the normal variance is determined by way of:

$$R = (\Sigma_{i=1}^{n} \hat{R})/n, X = e^{\mu' + \delta' Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where $95^{th}$ percentile of the lognormal distribution occurs at $\mu' + 1.645 * \delta'$, $\mu'$ is a mean value in the lognormal distribution, $\delta'$ is a standard deviation in the lognormal distribution.

In this example, if either the clustering quality is below the normal quality or the clustering variance is above the normal variance, then the ECU finds the clustering contribution of each anchor by way of the intersections of the aligned data for the at least one cluster. In one example, the clustering contribution may be found by mapping back to each sensor (anchor) via the intersections of the aligned data for the at least one cluster with:

$$I^{j+}_{<i,i+1>} = (x+, y+) \text{ and } I^{j-}_{<i,i+1>} = (x-, y-),$$

$$N_p = \sum_{k=0}^{k=C_N^2} NoI_k$$

and its derivatives as provided above. Moreover, a lowest contribution count of a sensor in the at least one cluster defines the first contribution low. Furthermore, if both the clustering quality is above the normal quality and the clustering variance is below the normal variance, then negligible sensor error is concluded.

Based on determining intersections of the aligned data and points of intersection (see block 216), the method in block 230 further comprises clustering the points of intersections in at least four groups of at least three UWB anchors by way of:

$$\epsilon = P * \frac{\sum_{i=1}^{n} (\hat{R}_i)}{n} \text{ and } \text{Min}(P) = m^2 + 1$$

to define at least four cluster groups of points of the UWB anchors. For example, system 10 comprises four anchors 20, 21, 22, 23 thereby defining four cluster groups: 20-21-22, 20-21-23, 20-22-23, and 21-22-23. The cluster groups may be categorized as groups A, B, C, and D, respectively.

In block 232, the method 210 via the clustering module further comprises calculating a clustering quality for each of the at least four cluster groups by way of:

$$\rho = \frac{1}{e^{\left| N_c - \frac{N_p}{2} \right|}}$$

to define a grouped clustering quality for each of the at least four cluster groups.

In block 234, the method 210 via the clustering module comprises determining a geometric center for each of the at least four cluster groups by way of:

$$o_c = \frac{\sum_{i=0}^{n} p_i}{n}$$

to define a grouped geometric center for each of the at least four cluster groups (here, A-D).

In block 236, the method 210 via the clustering module further comprises calculating a clustering variance for each of the at least four cluster groups by way of:

$$\delta = \sqrt{\frac{\sum_{i=0}^{n} p_i - o_c}{n}}$$

to define a grouped clustering variance for each of the at least four cluster groups.

In block 238, the method 210 via the ECU 30 comprises finding a grouped clustering contribution for each anchor of its respective cluster group by way of the intersections of the aligned data when one of the grouped clustering quality is below the normal quality and the grouped clustering variance is above the normal variance to define a grouped contribution low of one of the anchors in the cluster groups. That is, the ECU conducts a performance verification with respect to the grouped clustering quality and the grouped clustering variance.

More specifically, in the performance verification, the ECU 30 compares the grouped clustering quality with the normal quality (discussed below) and compares the grouped clustering variance with the normal variance (discussed below) of each cluster group. In addition, the ECU 30 compares the grouped clustering quality with the normal quality by way of:

$$Q^* = e^{\frac{1}{\frac{n}{2}-1}}$$

and the ECU is arranged to compare the grouped clustering variance with the normal variance is by way of:

$$V^* = -0.0075R^2 + 0.25R - 1.63, \text{ as discussed above.}$$

Additionally, the normal variance is determined by way of:

$$R = (\Sigma_{i=1}^{n} \hat{R})/n, X = e^{\mu' + \delta' Z},$$

$$Z(0.95) = 1.645,$$

$\mu' = -0.0075R^2 + 0.23R - 2.72$, and $\delta' = 0.014R + 0.39$, as discussed above.

In this embodiment, if either the grouped clustering quality is below the normal quality or the grouped clustering variance is above the normal variance, then the ECU 30 is arranged to find the grouped clustering contribution of each anchor by way of the intersections of the aligned data. In one example, the grouped clustering contribution may be found by mapping back to each sensor (anchor) via the intersections of the aligned data for any of the at least four cluster groups with:

$$I^{j+}_{<i,i+1>} = (x+, y+) \text{ and } I^{j-}_{<i,i+1>} = (x-, y-),$$

$$N_p = \sum_{k=0}^{k=C_N^2} NoI_k$$

and its derivatives as provided above. Moreover, a lowest contribution count of a sensor in the at least four cluster groups defines the grouped contribution low. Furthermore, if both the grouped clustering quality is above the normal quality and the grouped clustering variance is below the normal variance, then negligible sensor error is concluded.

Additionally in block 238, the method 210 via the ECU further comprises comparing the grouped contribution low with the first contribution low. Furthermore, the method via the ECU 30 in block 240 comprises determining an erratic anchor based on the lowest cluster contribution of a sensor. In this example, the ECU 30 determines the erratic anchor based on a lesser between the grouped contribution low and the first contribution low of one of the anchors. Hence, the erratic sensor is identified to be the sensor with the lowest cluster contribution. In turn, a number of protocols may be triggered or put in place as desired. For example, the ECU 30 may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

Figure 4:
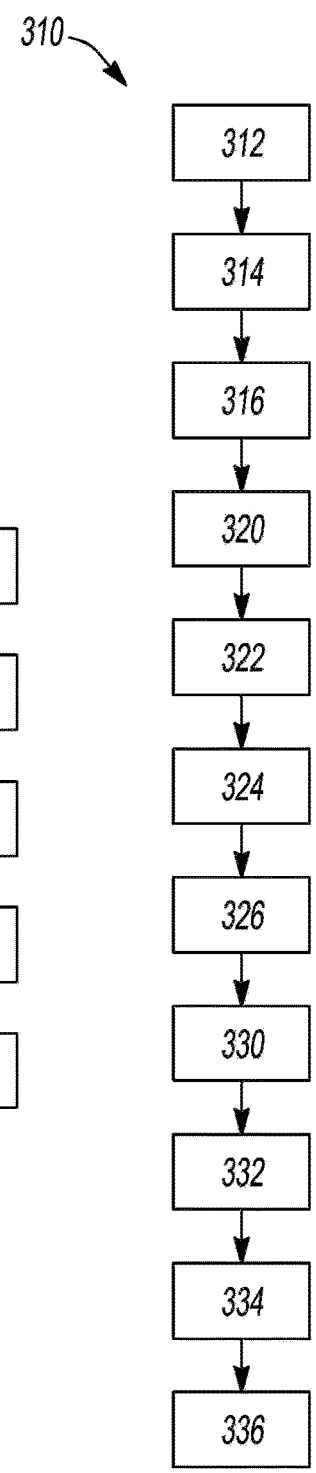
FIG. 4 is a flowchart of a method for diagnosing sensor performance of a UWB sensor localization for a vehicle in accordance with yet another example of the present disclosure.

FIG. 4 depicts a flowchart for a method 310 of diagnosing sensor performance for a UWB sensor localization of a vehicle in accordance with yet another example of the present disclosure. In this example, the system 10 of FIG. 1 implements steps of the method 310 discussed in greater detail below. Moreover, it is to be understood that the ECU 30 of system 10 may comprise a number of modules (see above) arranged to run algorithms and formulas to calculate, compute, and determine values to assist in achieving the steps of the method 310.

As shown in block 312, the method 310 comprises receiving sensor signals from at least four UWB anchors and a UWB tag for a time period. The sensor signals represent anchor coordinates and real-time distances between the tag and each anchor.

In block 314, the method 310 further comprises aligning the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{s_i}$ is an initial timestamp of the time period, k is a number of timestamps of the time period, $f_i$ is a fixed data uploading frequency, $t_i$ is the aligned timestamp, and $t_{s_i} + k/f_i$ is at an upper limit thereof to define aligned data.

In block 316, the method 310 further comprises determining intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2$ is an overall number of groups, and $NoI_k$ is a number of intersections between a pair of non-concentric circles of the aligned data to define points of intersections.

In block 320, the method 310 further comprises clustering the points of intersections by way of:

$$\epsilon = P * \frac{\sum_{k=1}^{n} (\hat{R}_i)}{n} \text{ and } \text{Min}(P) = m^2 + 1$$

where $\epsilon$ is the distance threshold between each point, P is a distance ratio threshold, n is a number of sensors, and $R_i$ is an average distance value of the aligned data from the UWB anchors, Min(P) is the minimum points threshold, and m is a number of signals from the UWB anchors to define at least one cluster of points of the UWB anchors.

Moreover in block 322, the method 310 further comprises calculating a clustering quality of each of the at least one cluster by way of:

$$\rho = \frac{1}{e^{\left|N_c - \frac{N_p}{2}\right|}}$$

where $\rho$ is the clustering quality, e is error between a number of points in the at least one cluster, and $N_c$ is a number of points in the at least one cluster.

Further, in block 324, the method 310 comprises determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster.

Additionally in block 326, the method 310 comprises calculating a clustering variance of each of the at least one cluster by way of:

$$\delta = \sqrt{\frac{\sum_{i=0}^{n} p_i - o_c}{n}}$$

where δ is the clustering variance, $p_i$ is points of the at least one cluster, $o_c$ is a geometric center of each cluster to define a sensed location of the tag for each cluster.

In block 330, the method 310 further comprises comparing the clustering quality with a normal quality by way of:

$$Q^* = e^{\frac{1}{\frac{n}{2}-1}}$$

where Q* is the normal quality, e is sensor error, and N is a number of signals for each anchor.

In block 332, the method 310 further comprises comparing the clustering variance with a normal variance by way of:

$$V^* = -0.0075R^2 + 0.25R - 1.63$$

where V* is the normal variance and R is a target distance.

In block 334, the method 310 further comprises finding a clustering contribution of each anchor by way of the intersections of the aligned data for the at least one cluster when one of the clustering quality is below the normal quality and the clustering variance is above the normal variance to define a first contribution low of one of the anchors.

Furthermore in block 336, the method 310 comprises determining an erratic anchor based the contribution low.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of diagnosing sensor performance of an ultra wide band (UWB) sensor localization for a vehicle, the method comprising:

receiving sensor signals from at least four UWB anchors and a UWB tag for a time period, the sensor signals representing anchor coordinates and real-time distances between the tag and each anchor;

aligning the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit thereof to define aligned data;

determining intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2$ is an overall number of groups, and $NoI_k$ is a number of intersections between a pair of non-concentric circles of the aligned data to define points of intersections;

clustering the points of intersections by way of:

$$\epsilon = P * \frac{\sum_{i=1}^{n}(\hat{R}_i)}{n} \text{ and } Min(P) = m^2 + 1$$

where ϵ is a distance threshold between each point, P is a distance ratio threshold, n is a number of sensors, and $R_i$ is an average distance value of the aligned data from the UWB anchors, Min(P) is a minimum points threshold, and m is a number of signals from the UWB anchors to define at least one cluster of points of the UWB anchors;

calculating a clustering quality of each of the at least one cluster by way of:

$$\rho = \frac{1}{e^{\left|N_c - \frac{N_p}{2}\right|}}$$

where ρ is the clustering quality, e is error between a number of points in the at least one cluster, and $N_c$ is a number of points in the at least one cluster;

determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster;

calculating a clustering variance of each of the at least one cluster by way of:

$$\delta = \sqrt{\frac{\sum_{i=0}^{n} p_i - o_c}{n}}$$

where δ is the clustering variance, $p_i$ is points of the at least one cluster, $o_c$ is a geometric center of each cluster to define a sensed location of the tag for each cluster;

finding a clustering contribution of each anchor by way of the intersections of the aligned data for the at least one cluster when one of the clustering quality is below a normal quality and the clustering variance is above a normal variance to define a first contribution low of one of the anchors; and determining an erratic anchor based the contribution low.

2. The method of claim 1 wherein determining intersections of the aligned data comprises:

determining a pair of circles defined by the aligned data of the anchors, each circle having coordinates defined by:

$$cir_i^j : (X - x_i)^2 + (Y - y_i)^2 = (r_i^j)^2,$$

each anchor having coordinates defined by:

$$C_i = (x_i, y_i)$$

the aligned data being denoted as:

$$R_i = r_i^1, r_i^2, \ldots r_i^{mi}$$

where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_j$ is a sequence of ranging signals from each anchor, $r_i^j$ is the $j^{th}$ signal of the aligned data of the anchors;

determining a distance between the pair of circles with:

$$D_{<O_i,O_{i'}>} = \sqrt{(x_i-x_{i'})^2+(y_i-y_{i'})^2},$$

where D is a distance between the pair of circles $O_i$ and $O_{i'}$; and determining a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

3. The method of claim 2 wherein determining intersections of the aligned data comprises:

determining intersection coordinates of the pair of circles with:

$$P^+_{<i,i+1>} = (x+,y+) \text{ and } P^-_{<i,i+1>} = (x-,y-),$$

where $P^+_{<i,i+1>}$ and $P^-_{<i,i+1>}$ are two symmetrical intersections coordinate of two circle $O_i^j$ and $O_i^{j'}$.

4. The method of claim 3 wherein determining intersection coordinates of the pair of circles is by way of:

$$x+ = x_i + \frac{a(x_{i+1}-x_i)}{D_{<O_i,O_{i+1}>}} + h * \frac{(y_{i+1}-y_i)}{D_{<O_i,O_{i+1}>}},$$

$$y+ = y_i + \frac{a(y_{i+1}-y_i)}{D_{<O_i,O_{i+1}>}} - h * \frac{(x_{i+1}-x_i)}{D_{<O_i,O_{i+1}>}},$$

$$x- = x_i + \frac{a(x_{i+1}-x_i)}{D_{<O_i,O_{i+1}>}} - h * \frac{(y_{i+1}-y_i)}{D_{<O_i,O_{i+1}>}}, \text{ and}$$

$$y- = y_i + \frac{a(y_{i+1}-y_i)}{D_{<O_i,O_{i+1}>}} + h * \frac{(x_{i+1}-x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

5. The method of claim 1 wherein finding the clustering contribution comprises:

comparing the clustering quality with the normal quality; and comparing the clustering variance with the normal variance.

6. The method of claim 5 wherein comparing the clustering quality with the normal quality is by way of:

$$Q^* = e^{\frac{n}{2}-1}$$

where Q* is the normal quality, e is sensor error, and n is the total number of signals, and wherein comparing the clustering variance with the normal variance is by way of:

$$V^* = -0.0075R^2 + 0.25R - 1.63$$

where V* is the normal variance and R is a target distance.

7. The method of claim 6 wherein the normal variance is determined by way of:

$$R = (\Sigma_{i=1}^n \hat{R})/n, X = e^{\mu'+\delta' Z},$$

$$Z(0.95) = 1.645,$$

$$\mu' = -0.0075R^2 + 0.23R - 2.72, \text{ and}$$

$$\delta' = 0.014R + 0.39,$$

where $\hat{R}$ is a distance value between the tag and each anchor, n is the total number of signals, X is a lognormal distribution, Z is a standard normal variable where $95^{th}$ percentile of the lognormal distribution occurs at $\mu'+1.645*\delta'$, $\mu'$ if is a mean value in the lognormal distribution, $\delta'$ is a standard deviation in the lognormal distribution.

8. The method of claim 1 further comprising:

clustering the points of intersections in at least four groups of at least three UWB anchors by way of:

$$\epsilon = P * \frac{\sum_{i=1}^n (\hat{R}_i)}{n} \text{ and } \text{Min}(P) = m^2 + 1$$

to define at least four cluster groups of points of the UWB anchors;

calculating a clustering quality for each of the at least four cluster groups by way of:

$$\rho = \frac{1}{e^{\left|N_c - \frac{N_\rho}{2}\right|}}$$

to define a grouped clustering quality for each of the at least four cluster groups;

determining a geometric center for each of the at least four cluster groups by way of:

$$o_c = \frac{\sum_{i=0}^n p_i}{n}$$

to define a grouped geometric center for each of the at least four cluster groups; and calculating a clustering variance for each of the at least four cluster groups by way of:

$$\delta = \sqrt{\frac{\sum_{i=0}^n p_i - o_c}{n}}$$

to define a grouped clustering variance for each of the at least four cluster groups;

finding a grouped clustering contribution for each cluster group by way of the intersections of the aligned data when one of the grouped clustering quality is below the normal quality and the grouped clustering variance is above the normal variance to define a grouped contribution low of one of the anchors in the cluster groups; and comparing the grouped contribution low of the cluster groups with the first contribution low of one of the anchors, wherein determining the erratic anchor is based on a lesser between the grouped contribution low and the first contribution low of one of the anchors.

9. The method of claim 8 wherein finding the grouped clustering contribution comprises:

comparing the grouped clustering quality with the normal quality; and comparing the grouped clustering variance with the normal variance.

10. A system for diagnosing sensor performance of an ultra wide band (UWB) sensor localization for a vehicle, the system comprising:

a UWB tag arranged to be mobile and trackable by way of a sensor signal;

at least four UWB anchors, each UWB anchor being in communication with the UWB tag and arranged to receive and send the sensor signal for tracking the UWB tag; and a gateway in communication with the UWB anchor, the gateway comprising an electronic control unit (ECU) arranged to receive sensor signals from at the UWB anchors for a time period, the sensor signals representing anchor coordinates and real-time distances between the tag and each anchor, the ECU comprising:

a preprocessing module arranged to align the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit thereof to define aligned data, the preprocessing module arranged to determine intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2$ is an overall number of groups, and $NoI_k$ is a number of intersections between a pair of non-concentric circles of the aligned data to define points of intersections; and a clustering module arranged to cluster the points of intersections by way of:

$$\epsilon = P * \frac{\sum_{i=1}^{n}(\hat{R}_i)}{n} \text{ and } \text{Min}(P) = m^2 + 1$$

where $\epsilon$ is a distance threshold between each point, P is a distance ratio threshold, n is a number of sensors, and $R_i$ is an average distance value of the aligned data from the UWB anchors, Min(P) is a minimum points threshold, and m is a number of signals from the UWB anchors to define at least one cluster of points of the UWB anchors, the clustering module further arranged to determine a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster, the clustering module further arranged to calculate a clustering quality of each of the at least one cluster by way of:

$$\rho = \frac{1}{e^{\left|N_c - \frac{N_p}{2}\right|}}$$

where ρ is the clustering quality, e is error between a number of points in the at least one cluster, and $N_c$ is a number of points in the at least one cluster, the clustering module further arranged to calculate a clustering variance of each of the at least one cluster by way of:

$$\delta = \sqrt{\frac{\sum_{i=0}^{n} p_i - o_c}{n}}$$

where δ is the clustering variance, $p_i$ is points of the at least one cluster, $o_c$ is a geometric center of each cluster to define a sensed location of the tag for each cluster, wherein the ECU is arranged to find a clustering contribution of each anchor by way of the intersections of the aligned data for the at least one cluster when one of the clustering quality is below a normal quality and the clustering variance is above a normal variance to define a first contribution low of one of the anchors and wherein the ECU is arranged to determine an erratic anchor based the contribution low.

11. The system of claim 10 wherein the preprocessing module is arranged to determine intersections of the aligned data comprises:

the preprocessing module arranged to determine a pair of circles defined by the aligned data of the anchors, each circle having coordinates defined by:

$$cir_i^j : (X-x_i)^2 + (Y-y_i)^2 = (r_i^j)^2,$$

each anchor having coordinates defined by:

$$C_i = (x_i, y_i)$$

the aligned data being denoted as:

$$R_i = r_i^1, r_i^2, \ldots r_i^{mi}$$

where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors; and the preprocessing module arranged to determine a distance between the pair of circles with:

$$D_{<O_i,O_i>} = \sqrt{(x_i-x_i)^2 + (y_i-y_i)^2},$$

where D is a distance between the pair of circles $O_i$ and $O_{i'}$;
the preprocessing module being arranged to determine a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

12. The system of claim 11 wherein the preprocessing module is arranged to determine intersections of the aligned data further comprises:
the preprocessing module arranged to determine intersection coordinates of the pair of circles with:

$$P^+_{<i,i+1>}=(x+,y+) \text{ and } P^-_{<i,i+1>}=(x-,y-),$$

where $P^+_{<i,i+1>}$ and $P^-_{<i,i+1>}$ are two symmetrical intersections coordinate of two circle $O_i^j$ and $O_i^{j'}$.

13. The system of claim 12 wherein the preprocessing module being arranged to determine intersection coordinates of the pair of circles is by way of:

$$x+ = x_i + \frac{a(x_{i+1}-x_i)}{D_{<O_i,O_{i+1}>}} + h*\frac{(y_{i+1}-y_i)}{D_{<O_i,O_{i+1}>}},$$

$$y+ = y_i + \frac{a(y_{i+1}-y_i)}{D_{<O_i,O_{i+1}>}} - h*\frac{(x_{i+1}-x_i)}{D_{<O_i,O_{i+1}>}},$$

$$x- = x_i + \frac{a(x_{i+1}-x_i)}{D_{<O_i,O_{i+1}>}} - h*\frac{(y_{i+1}-y_i)}{D_{<O_i,O_{i+1}>}}, \text{ and}$$

$$y- = y_i + \frac{a(y_{i+1}-y_i)}{D_{<O_i,O_{i+1}>}} + h*\frac{(x_{i+1}-x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and}$$

$$h = \sqrt{(r_{i+1}^j)^2 - a^2},$$

respectively.

14. The system of claim 10 wherein the ECU is arranged to find the clustering contribution comprises the ECU arranged to compare the clustering quality with the normal quality and to compare the clustering variance with the normal variance.

15. The system of claim 14 wherein the ECU is arranged to compare the clustering quality with the normal quality by way of:

$$Q^* = e^{\frac{1}{\frac{n}{2}-1}}$$

where Q* is the normal quality, e is sensor error, and n is the total number of signals, and wherein the ECU being arranged to compare the clustering variance with the normal variance is by way of:

$$V^*=-0.0075R^2+0.25R-1.63$$

where V* is the normal variance and R is a target distance.

16. The system of claim 15 wherein the normal variance is determined by way of:

$$R=(\Sigma_{i=1}^n \hat{R})/n, X=e^{\mu'+\delta'Z},$$

$$Z(0.95)=1.645,$$

$$\mu'=-0.0075R^2+0.23R-2.72, \text{ and}$$

$$\delta'=0.014R+0.39,$$

where $\hat{R}$ is a distance value between the tag and each anchor, n is the total number of signals, X is a lognormal distribution, Z is a standard normal variable where $95^{th}$ percentile of the lognormal distribution occurs at $\mu+1.645*\beta'$, $\mu'$ if is a mean value in the lognormal distribution, $\delta'$ is a standard deviation in the lognormal distribution.

17. The system of claim 10 wherein the clustering module is further arranged to cluster the points of intersections in at least four groups of at least three UWB anchors by way of:

$$\epsilon = P * \frac{\sum_{i=1}^n (\hat{R}_i)}{n} \text{ and}$$

$$\text{Min}(P) = m^2 + 1$$

to define at least four cluster groups of points of the UWB anchors,
wherein the clustering module is further arranged to calculate a clustering quality for each of the at least four cluster groups by way of:

$$\rho = \frac{1}{e^{\left|N_c - \frac{N_p}{2}\right|}}$$

to define a grouped clustering quality for each of the at least four cluster groups,
wherein the clustering module is further arranged to determine a geometric center for each of the at least four cluster groups by way of:

$$o_c = \frac{\sum_{i=0}^n p_i}{n}$$

to define a grouped geometric center for each of the at least four cluster groups,
wherein the clustering module is further arranged to calculate a clustering variance for each of the at least four cluster groups by way of:

$$\delta = \sqrt{\frac{\sum_{i=0}^n p_i - o_c}{n}}$$

to define a grouped clustering variance for each of the at least four cluster groups,
wherein the ECU is further arranged to find a grouped clustering contribution for each cluster group by way of the intersections of the aligned data when one of the grouped clustering quality is below the normal quality and the grouped clustering variance is above the normal variance to define a grouped contribution low of one of the anchors in the cluster groups,
wherein the ECU is further arranged to compare the grouped contribution low of the cluster groups with the first contribution low of one of the anchors, and
wherein the ECU is further arranged to determine the erratic anchor is based on a lesser between the grouped contribution low and the first contribution low of one of the anchors.

18. The system of claim 17 wherein the ECU is arranged to find the grouped clustering contribution comprises the ECU further arranged to compare the grouped clustering quality with the normal quality and compare the grouped clustering variance with the normal variance.

19. A method of diagnosing sensor performance of an ultra wide band (UWB) sensor localization for a vehicle, the method comprising:
receiving sensor signals from at least four UWB anchors and a UWB tag for a time period, the sensor signals representing anchor coordinates and real-time distances between the tag and each anchor;
aligning the sensor signals at an aligned timestamp during the time period to define aligned data;
determining intersections of the aligned data based on the anchor coordinates and the real-time distances to define points of intersections;
clustering the points of intersections to define at least one cluster of points of the UWB anchors;
calculating a clustering quality of each of the at least one cluster;
determining a geometric center of the at least one cluster;
calculating a clustering variance of each of the at least one cluster;
comparing the clustering quality with a normal quality;
comparing the clustering variance with a normal variance;
finding a clustering contribution of each anchor by way of the intersections of the aligned data for the at least one cluster when one of the clustering quality is below the normal quality and the clustering variance is above the normal variance to define a first contribution low of one of the anchors; and
determining an erratic anchor based the contribution low.

20. The method of claim 19 further comprising:
clustering the points of intersections in at least four groups of at least three UWB anchors to define at least four cluster groups of points of the UWB anchors;
calculating a clustering quality for each of the at least four cluster groups to define a grouped clustering quality for each of the at least four cluster groups;
determining a geometric center for each of the at least four cluster groups to define a grouped geometric center for each of the at least four cluster groups; and
calculating a clustering variance for each of the at least four cluster groups to define a grouped clustering variance for each of the at least four cluster groups;
finding a grouped clustering contribution for each cluster group by way of the intersections of the aligned data when one of the grouped clustering quality is below the normal quality and the grouped clustering variance is above the normal variance to define a grouped contribution low of one of the anchors in the cluster groups; and
comparing the grouped contribution low of the cluster groups with the first contribution low of one of the anchors,
wherein determining the erratic anchor is based on a lesser between the grouped contribution low and the first contribution low of one of the anchors.

* * * * *